United States Patent
Chiang et al.

(10) Patent No.: US 7,697,388 B2
(45) Date of Patent: Apr. 13, 2010

(54) DEFECT MANAGEMENT METHOD AND SYSTEM OF OPTICAL DISK DRIVE

(75) Inventors: Chun-Ying Chiang, Chiayi (TW); Ming-Hung Lee, Taipei County (TW); Shu-Fang Tsai, Hsinchu (TW)

(73) Assignee: MediaTek Inc., Hsin-Chu, Hsien (TW)

( * ) Notice: Subject to any disclaimer, the term of this patent is extended or adjusted under 35 U.S.C. 154(b) by 925 days.

(21) Appl. No.: 11/278,968

(22) Filed: Apr. 7, 2006

(65) Prior Publication Data

US 2006/0171280 A1    Aug. 3, 2006

Related U.S. Application Data

(63) Continuation-in-part of application No. 10/065,768, filed on Nov. 18, 2002, now Pat. No. 7,050,369.

(30) Foreign Application Priority Data

May 28, 2002    (TW) ............... 91111375 A (51) Int. Cl.
G11B 7/00    (2006.01)
(52) U.S. Cl. ............... 369/53.17; 369/53.2; 369/53.15; 369/47.14
(58) Field of Classification Search ............ None
See application file for complete search history.

(56) References Cited

U.S. PATENT DOCUMENTS

| | | | |
|---|---|---|---|
| 4,774,700 A | 9/1988 | Satoh et al. | |
| 5,132,956 A | 7/1992 | Ichikawa | |
| 5,235,585 A | 8/1993 | Bish et al. | |
| 5,271,018 A | 12/1993 | Chan | |
| 5,319,627 A | 6/1994 | Shinno et al. | |
| 5,715,221 A | 2/1998 | Ito et al. | |
| 6,275,456 B1 | 8/2001 | Jeong | |
| 6,396,786 B2 | 5/2002 | Jeong | |
| 6,408,408 B1 | 6/2002 | Ko | |
| 6,453,384 B1 | 9/2002 | Park et al. | |
| 6,556,522 B1 | 4/2003 | Ko | |
| 6,560,177 B2 | 5/2003 | Ko | |
| 6,564,345 B1 * | 5/2003 | Kim et al. ............ 714/723 |
| 6,587,413 B2 | 7/2003 | Ko | |
| 6,594,208 B1 | 7/2003 | Ko | |
| 6,697,307 B1 | 2/2004 | Ko | |
| 6,747,929 B1 | 6/2004 | Ko | |
| 6,879,553 B2 | 4/2005 | Ko | |

(Continued)

Primary Examiner—Muhammad N. Edun
(74) Attorney, Agent, or Firm—Winston Hsu (57) ABSTRACT

A defect management method applied in an optical disc drive for managing defect information of an optical disc is disclosed. The optical disc drive saves a plurality of defect tables comprising at least a first defect table and a second defect table. The first defect table records a plurality of first defect entries and the second defect table records a plurality of second defect entries. The method includes appending an adaptive defect entry comprising a new defect information corresponding to a new defect into a new defect table, a data structure of the adaptive defect entry conforming to a data structure of at least one of the defect entries recorded in the defect tables; and merging the adaptive defect entries into one of the defect tables saved in the optical disc drive when a condition is met.

22 Claims, 9 Drawing Sheets

U.S. PATENT DOCUMENTS

| | | |
|---|---|---|
| 7,085,206 B2 | 8/2006 | Ko |
| 7,085,207 B2 | 8/2006 | Ko |
| 7,116,614 B2 | 10/2006 | Ko |
| 7,177,250 B2 | 2/2007 | Ko |
| 2001/0008507 A1 | 7/2001 | Jeong |
| 2002/0097665 A1 | 7/2002 | Ko |
| 2002/0097666 A1 | 7/2002 | Ko |
| 2003/0095480 A1 | 5/2003 | Ko |
| 2003/0223327 A1 | 12/2003 | Lee |
| 2005/0135210 A1 | 6/2005 | Ko |
| 2005/0141368 A1 | 6/2005 | Ko |
| 2005/0141369 A1 | 6/2005 | Ko |
| 2006/0062114 A1 | 3/2006 | Ko |
| 2006/0067182 A1 | 3/2006 | Ko |

\* cited by examiner

DEFECT MANAGEMENT METHOD AND SYSTEM OF OPTICAL DISK DRIVE

CROSS REFERENCE TO RELATED APPLICATIONS

This is a continuation in part of U.S. application Ser. No. 10/065,768 that was filed on Nov. 18, 2002 now U.S. Pat. No. 7,050,369 and is included herein by reference.

BACKGROUND

1. Technical Field

The present invention relates to an optical disc drive and method of managing and storing addresses of defective data blocks on an optical disc, and more particularly, to an optical disc drive and method of managing and storing addresses of defective data blocks on an optical disc which creates a new defect table in the memory.

2. Description of the Prior Art

Optical discs, given their compact size, high capacity storage, and low price, have rapidly become one of the most dominant, non-volatile storage media in the contemporary information society. For example, the development of a DVD-RAM has made it possible for users to write data onto optical discs in accordance with their own specific needs, which affords the DVD-RAM a high degree of application flexibility.

It is necessary to have an optical disc drive before reading and writing data onto an optical disc. Please refer to FIG. 1 that shows a conventional optical disc drive 10. The optical disc drive 10 comprises a holder plate 14 to carry an optical disc 22, a motor 12 that drives the holder plate 14, a read/write head 16 that accesses data on the optical disc 22, a control circuit 18 that controls the operation of the optical disc drive 10, and a memory 20, such as Dynamic Random Access Memory (DRAM), that serves as a temporary storage device to record all relevant data during the operation of the control circuit 18.

Figure 1:
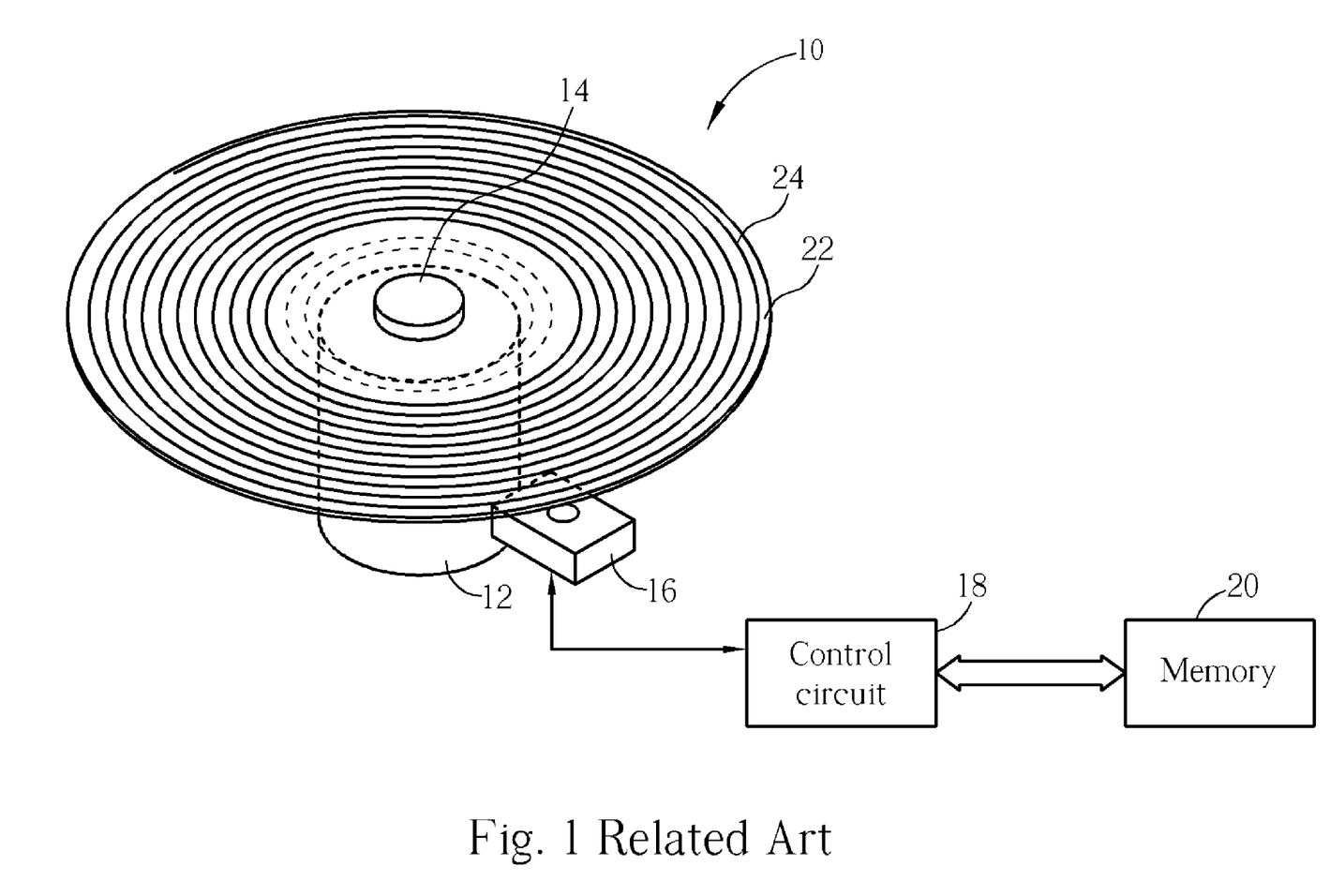
FIG. 1 is a diagram of a conventional optical disc drive.

The data on the optical disc 22 is recorded sequentially onto a track 24 through pit and land markings. It should be noted that for different kinds of optical discs, the schemes of recording the pit and land markings are different. Taking the DVD-RAM disc for example, a phase change technique is adopted to record pits and lands. In other words, data recording scheme applied to the DVD-RAM disc is similar to that applied to the CD-RW disc. When the optical disc drive 10 is ready to write data onto the optical disc 22, first the optical disc drive 10 stores the intended data in the memory 20 before writing the intended data onto the optical disc 22. The pick-up head 16 meanwhile checks for defects in the optical disc 22, and passes the check results back to control circuit 18.

Often due to defects stemming from scratch marks, change of material properties, or interference by micro-dust, data cannot be written onto the optical disc 22. To improve the reliability of an optical disc (e.g., a DVD-RAM disc), the information technology industry has committed itself to research and development optical disc defect management. When certain areas of the optical disc contain a defect that renders that area unsuitable for data storage, the DVD-RAM format redirects the target data for storage to a usable area.

When the optical disc drive 10 tries to access data on the optical disc 22, it temporarily loads the created defect table of the optical disc 22 into the memory 20. DT is hereinafter used to refer to the defect table of the optical disc 22 and as is well known the DVD-RAM optical disc contains two DTs that will be described in detail later. When the optical disc drive 10 tries to access data on the optical disc 22, the optical disc drive 10 uses the address of each data block to access the data it desires. If a data block is defective, the optical disc drive 10 then enlists the help of the DT to locate the replacement data block that stores the user data. In this manner, even with defects on the optical disc 22, the optical disc 22 still can store data for read-out.

On the other hand, the optical disc drive 10 writing data onto the optical disc 22 requires updating the DT in temporary storage in memory 20 accordingly. For instance, assume that during the write-in the optical disc drive 10 discovers a new defect on the optical disc 22 during a formatting stage or a writing data stage. The optical disc drive 10 directly inserts an entry corresponding to the new defect into the DT buffered in the memory 20 in defective address order (i.e., based on the address of the defect). The details of this operation are well known to those of average skill in this art and are therefore omitted herein for the sake of brevity. Later, when the optical disc drive 10 stops accessing data on the optical disc 22 the optical disc drive 10 writes the updated DT from the memory 20 onto the optical disc 22. For example, the optical disc drive 10 will stop access data on the optical disc 22 when the optical disc 22 is ejected at the conclusion of the formatting stage or the writing stage. This updated DT provides the reference that the optical disc drive 10 needs when it tries to access data on the optical disc 22 the next time around.

Figure 2:
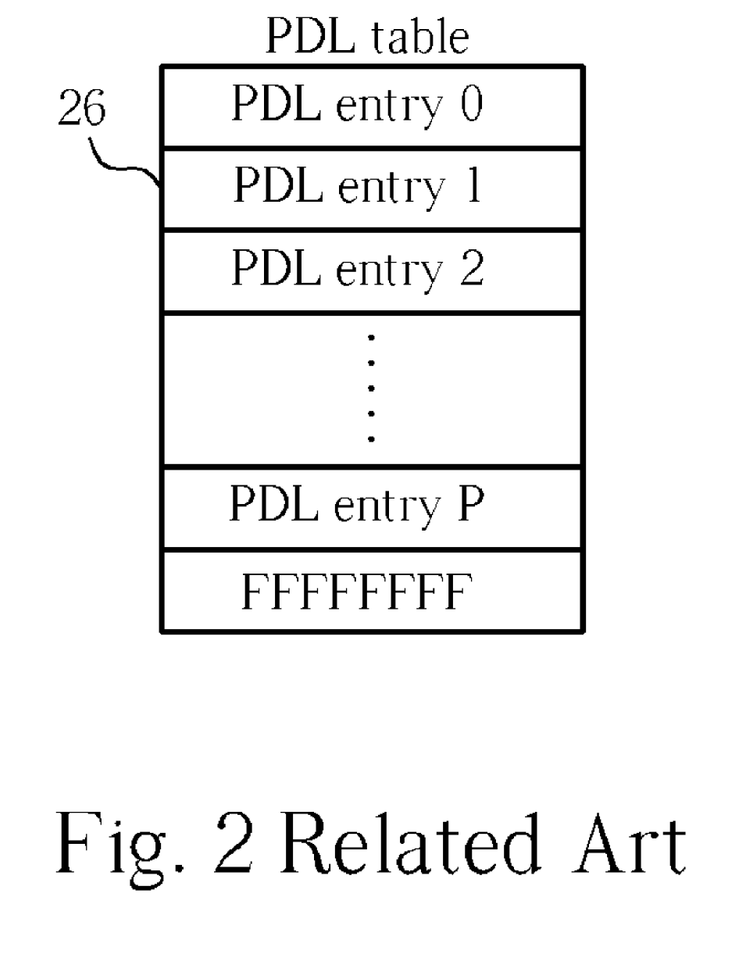
FIG. 2 is a diagram illustrating a primary defect list (PDL) table of an optical disc according to the related art.
Figure 3:
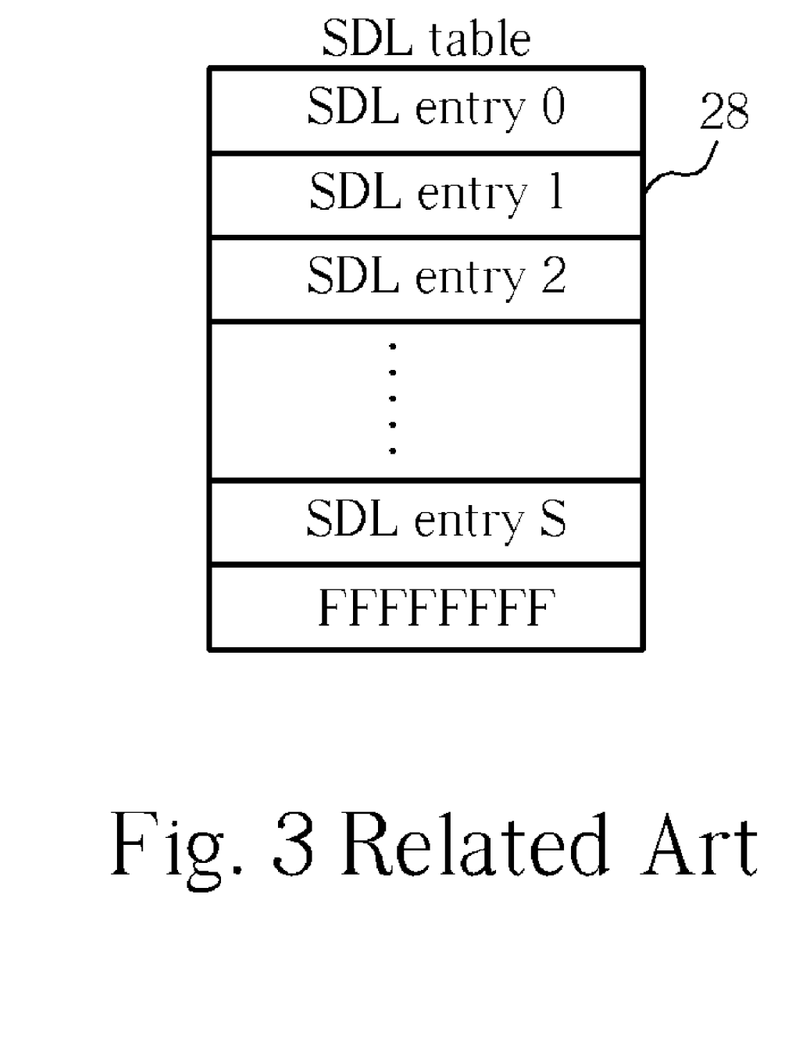
FIG. 3 is a diagram illustrating a secondary defect list (SDL) table of an optical disc according to the related art.

Please refer to FIG. 2 in conjunction with FIG. 3. FIG. 2 is a diagram illustrating a primary defect list (PDL) table 26 of the optical disc 20 according to the related art, and FIG. 3 is a diagram illustrating a secondary defect list (SDL) table 28 of the optical disc 20 according to the related art. Notice that for DVD-RAM disc the entries of the PDL table 26 are each four bytes that are composed of the following information and in parentheses the corresponding size required to store that information: PDL type (1 byte) and defective address (3 bytes). Also, notice that in the SDL table 28 the entries are each eight bytes that are composed of the following information and in parentheses the corresponding size required to store that information: SDL type (1 byte), defective address (3 bytes), reserve byte (1 byte), and replacement address (3 bytes). Regardless of their locations, the entries of the PDL table 26 and the SDL table 28 are sorted according to the addresses of the defective data blocks with which they correspond. For example, the defective data blocks can be sorted in an ascending order such as PDL entry 0<PDL entry 1<PDL entry 2<PDL entry P<FFFFFFFF. Please note that FFFFFFFF indicates the end of the PDL table 26. However, there may not exist any specific order among the corresponding addresses of the data blocks that are utilized in place of defective data blocks. In general, the PDL table 26 is used for recording defect entries during the formatting stage, while the SDL table 28 is used for recording defects during the data writing stage.

As mentioned earlier, if the optical disc drive 10 uncovers a defective data block during the write-in stage, the optical disc drive 10 replaces the defective data block with another data block (e.g., an available spare block) and updates the SDL table 28 that is temporarily stored in the memory 20 so that the updated SDL table 28 reflects the latest linkage between the defective blocks and the replacement data blocks.

It is apparent that this related art defect management method is inefficient as it results in unnecessary modifications to the PDL table 26 or the SDL table 28 in the memory 20 and the frequently executed sort operation will degrade performance of the memory 20. Therefore, it is apparent that new and improved methods and devices are needed.

SUMMARY

According to one aspect of the claimed invention, a defect management method applied in an optical disc drive for managing defect information of an optical disc is disclosed. The optical disc drive saves a plurality of defect tables comprising at least a first defect table and a second defect table, the first defect table records a plurality of first defect entries and the second defect table records a plurality of second defect entries, the method includes appending an adaptive defect entry comprising a new defect information corresponding to a new defect into a new defect table, a data structure of the adaptive defect entry conforming to a data structure of at least one of the defect entries recorded in the defect tables, and merging the adaptive defect entries into one of the defect tables saved in the optical disc drive when a condition is met.

According to another aspect of the claimed invention, a defect management system applied in an optical disc drive for managing defect information of an optical disc is disclosed. The system includes a pick-up head, a memory, and a controller. The memory saves a plurality of defect tables comprising at least a first defect table and a second defect table, the first defect table recording a plurality of first defect entries, the second defect table recording a plurality of second defect entries, and saving a new defect table for recording a plurality of adaptive defect entries corresponding to a plurality of new defect information, a data structure of the adaptive defect entries conforming to a data structure of at least one of the defect entries recorded in one of the defect tables. The controller, coupled to the pick-up head and the memory, controls the pick-up head to access the first and second defect tables from the optical disc and store the defect tables into the memory, appends a new defect entry into the new defect table until meeting a condition, and merges the adaptive defect entries into one of the defect tables saved in the optical disc drive when a condition is met.

The number of times the entries are sorted in the PDL table or the SDL table is reduced in the present disclosure. This is achieved by using the new defect list (NDL) table to buffer the adaptive defect entries of the new defective data blocks on the optical disc. In addition, when a merging operation is actuated, the NDL table to be merged with the PDL table or the SDL table already has adaptive defect entries stored in defective address order. In this way the merging operations is simplified.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 4:
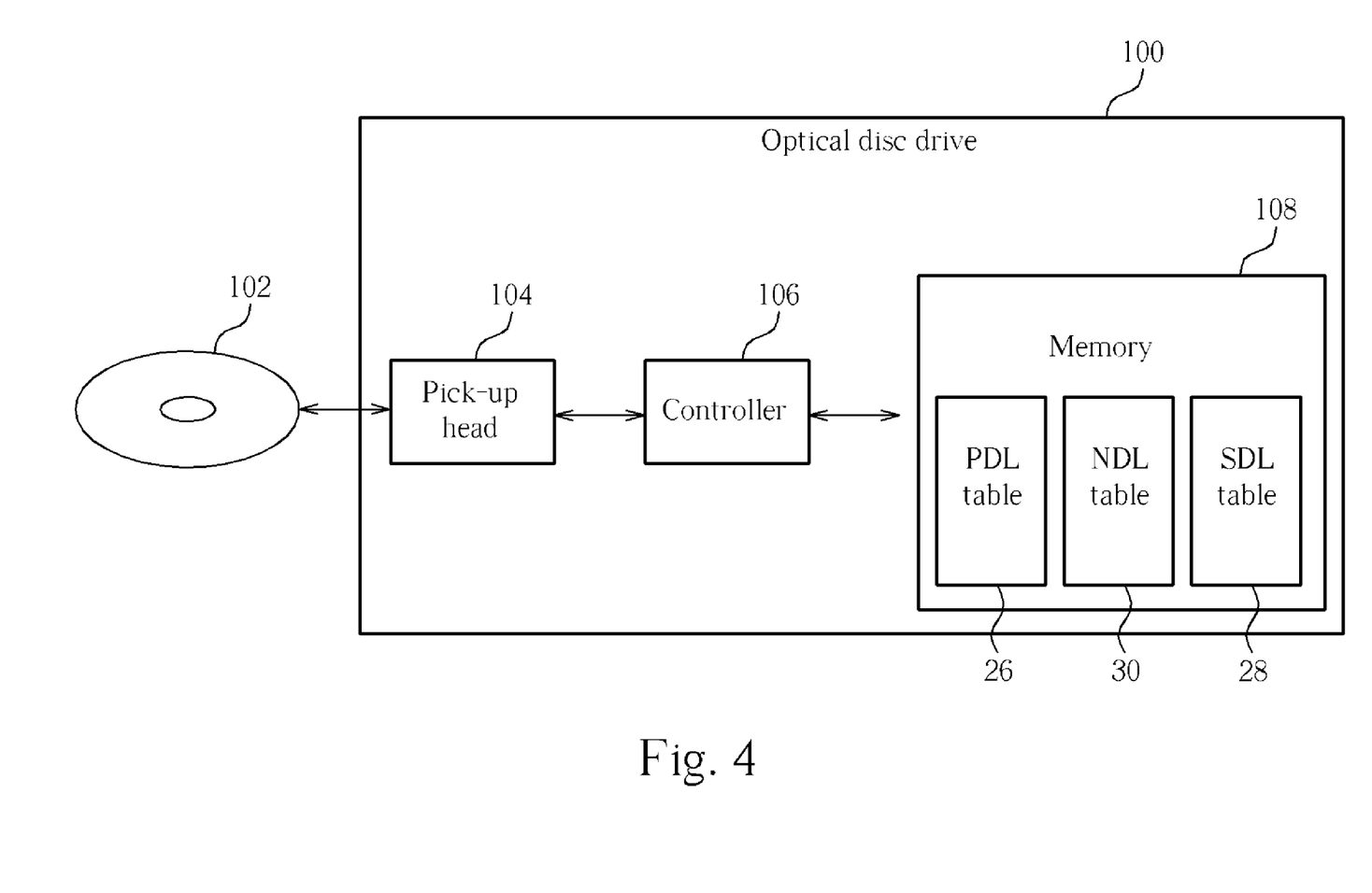
FIG. 4 is a diagram illustrating an optical disc drive according to an embodiment of the present invention.
Figure 5:
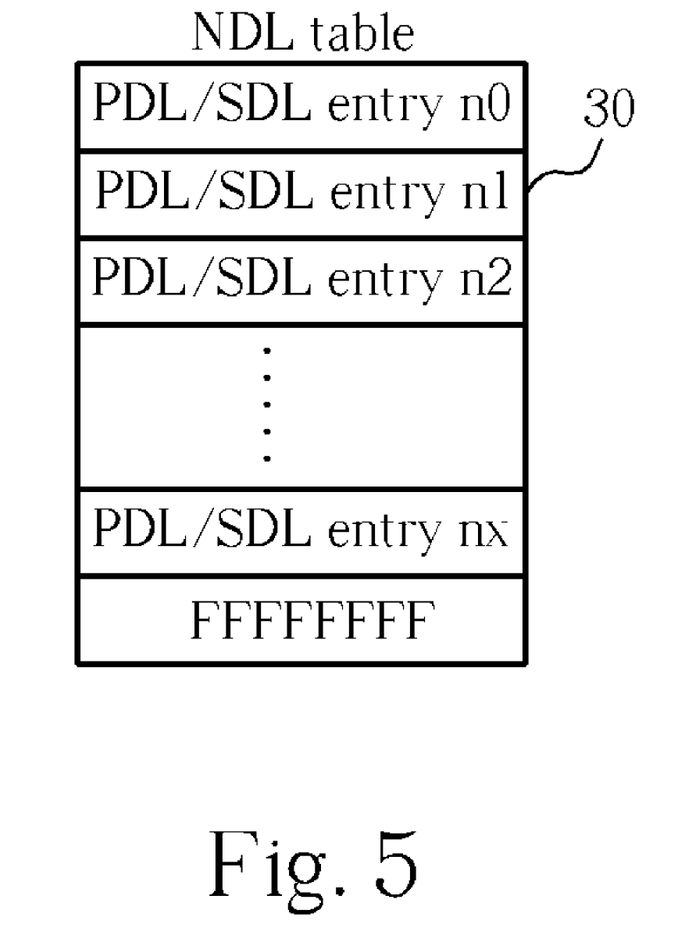
FIG. 5 is a diagram illustrating a new defect list (NDL) table according to an embodiment of the present invention.

Please refer to FIG. 4. FIG. 4 is a diagram illustrating an optical disc drive 100 according to an embodiment of the present invention. As shown in FIG. 4, the optical disc drive 100 includes a pick-up head 104 for accessing an optical disc 102 (e.g., a DVD-RAM disc), a controller 106 for controlling operation of the optical disc drive 100, and a memory (e.g., a DRAM) for buffering data such as the afore-mentioned PDL table 26 and SDL table 28. In this embodiment, after the optical disc drive 100 is powered on, the controller 106 will create a new defect list (NDL) table 30 in the memory 108. Please refer to FIG. 5. FIG. 5 is a diagram illustrating the NDL table 30 shown in FIG. 4. Please note that FIG. 5 is shown being possible either PDL or SDL compatible and this is indicated by the "PDL/SDL" notation in the adaptive defect entries of the NDL table 30. The NDL table 30 is created in the memory 108 of the optical disc drive 100 for storing adaptive defect entries of newly identified defects on the optical disc 102. The NDL table 30, in this embodiment, is created according to one of two stages of the optical disc drive 100. First, during a formatting stage the NDL table 30 complies with the four byte address size of the PDL table 26 of FIG. 2. During a data writing stage the NDL table 30 complies with the SDL table 28 of FIG. 2. Additionally, the NDL table 30 is created based on said stages but also according to the utilized capacity status of the defect table set, either the PDL table 26 or the SDL table 28. Specifically, during the formatting stage the PDL table 26 may become full, thereby causing the NDL table 30 to consist of adaptive defect entries that are compatible with the eight byte SDL defect entries to store the over flow because the PDL table 26 can store entries no more.

Figure 6:
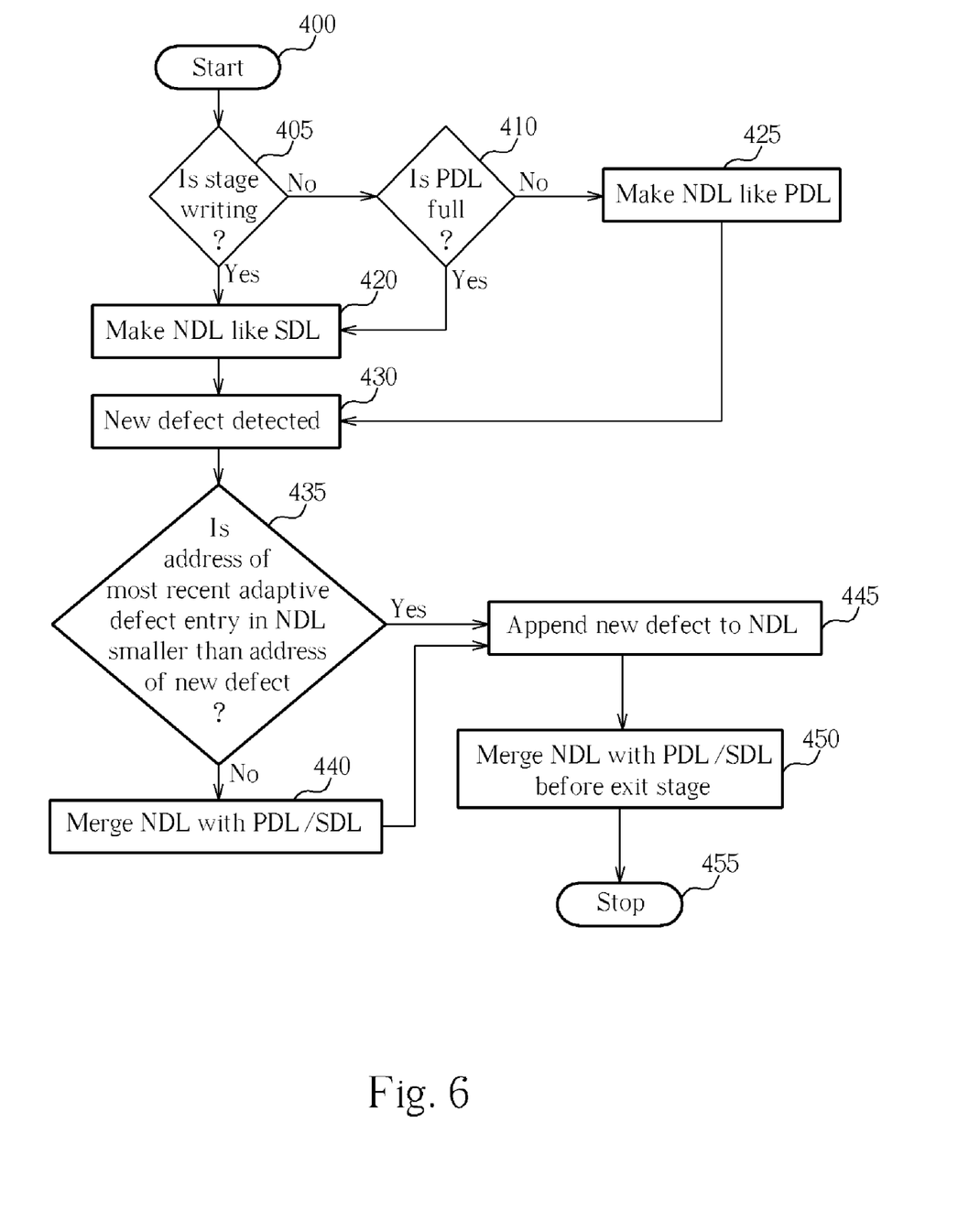
FIG. 6 is a flow chart illustrating a method of managing data on an optical disc according to an embodiment of the present invention.

Please refer to FIG. 6. FIG. 6 is a flow chart illustrating the method of managing data on the optical disc according to an embodiment of the present invention. The method of the present invention comprises the following steps:

Step 400: Start.
Step 405: Is stage writing? If yes, go to step 420.
Step 410: Is PDL full? If no, go to step 425.
Step 420: Create NDL table compatible with SDL table and go to step 430.
Step 425: Create NDL table compatible with PDL table.
Step 430: New defect is detected.
Step 435: Is address of most recent adaptive defect entry in NDL table smaller than the address of new defect? If yes, go to step 445.
Step 440: Merge the NDL table with the PDL table/SDL table.

Step 445: Appended new defect to the NDL table.

Step 450: Merge NDL table with PDL table/SDL table before exiting formatting or writing stage.

Step 455: Stop.

In step 400, the flow beings. In the beginning, the PDL table 26 and SDL table 28 stored on the optical disc 102 are read by the pick-up head 104, and then buffered into the memory 108. In step 405 it is determined if the adaptive defect entries of the NDL table 30 must be compatible with SDL type defect entries based on the disc operation mode of the optical disc drive 100. If the disc operation mode is a data writing stage, then in step 420 the NDL table 30 is created by the controller 106 to be compatible with the SDL table 28 otherwise in step 410, it is known that the disc operation mode or stage of the optical disc drive 100 is for disc formatting and it is determined if the utilized capacity status of the PDL table 26 is full. If yes, then the controller 106 creates the NDL table 30 having a data structure identical to a data structure of the SDL table 28 in step 420 or conversely, if not, then in step 425 the controller 106 creates the NDL table 30 having a data structure identical to a data structure of the PDL table 26 because it is known that the disc operation mode or stage of the optical disc drive 100 is for disc formatting and the utilized capacity status of the PDL table 26 is not full.

Figure 7:
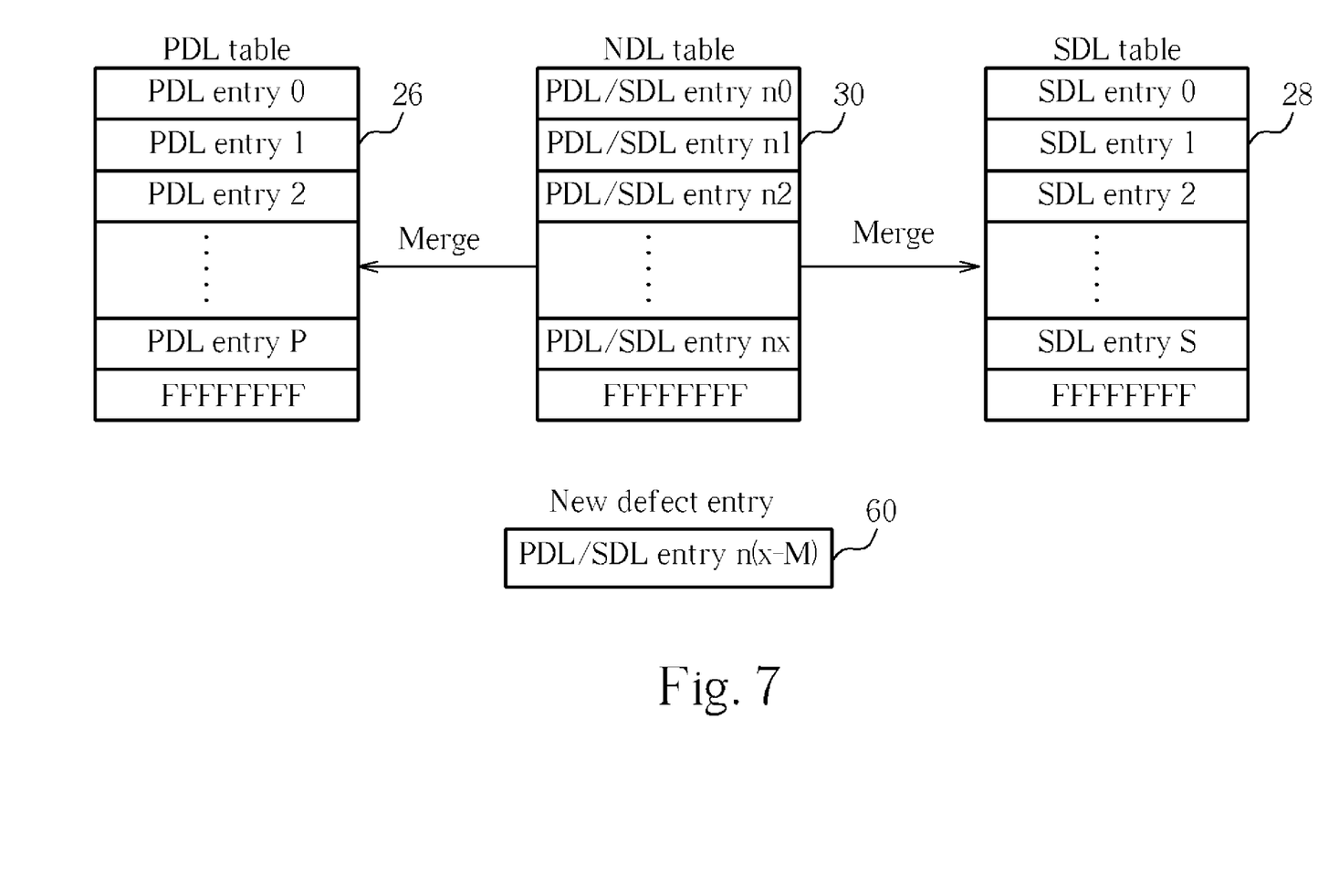
FIG. 7 is a diagram illustrating the NDL table being merged with the PDL table or the SDL table according to an embodiment of the present invention.
Figure 8:
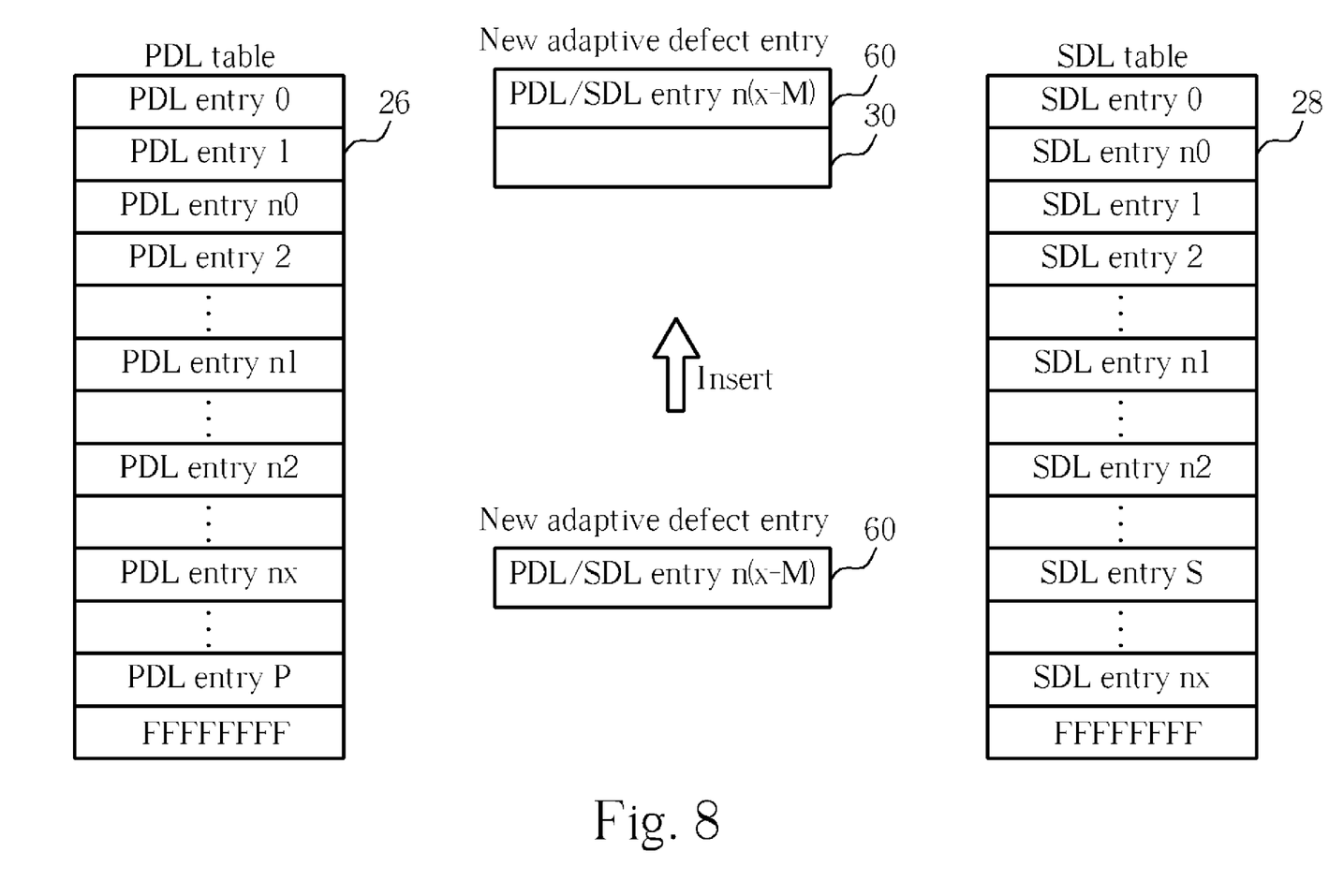
FIG. 8 is a diagram illustrating an adaptive defect entry being appended to the empty NDL table after the merging operation is completed according to an embodiment of the present invention.

In step 430, a new defect on the optical disc 102 is detected by any well-known means utilized by the optical disc drive 100. In step 435, the controller 106 must determine if the address of the most recent adaptive defect entry recorded in the NDL table 30 contains an address of a defective data block smaller than the address of the newly detected defective data block or not. If no, then in step 440 the NDL table 30 is merged with the PDL table or the SDL table depending on the stage being formatting or writing. Please refer to FIG. 7 and FIG. 8. FIG. 7 is a diagram illustrating the NDL table 30 being merged with the PDL table 26 or the SDL table 28 according to an embodiment of the present invention. FIG. 8 is a diagram illustrating a new adaptive defect entry being appended to the empty NDL table 30 after the merging operation is completed. As shown in FIG. 7, the new adaptive defect entry n (x−M) records an address for the newly detected defective data block smaller than the address contained in the last entry n x stored in the NDL table 30. Therefore, a merging operation is actuated. After the merging operation of step 440 is completed, the NDL table 30 becomes empty and the flow continues to step 445. As shown in FIG. 8, the new adaptive defect entry n (x−M) is appended to the empty NDL table 30 and then becomes the first adaptive defect entry in the NDL table 30. Please note, for simplification the NDL table 30 in FIG. 7 is shown being possible either PDL or SDL compatible and this is indicated by the "PDL/SDL" notation in the adaptive defect entries of the NDL table 30.

Figure 9:
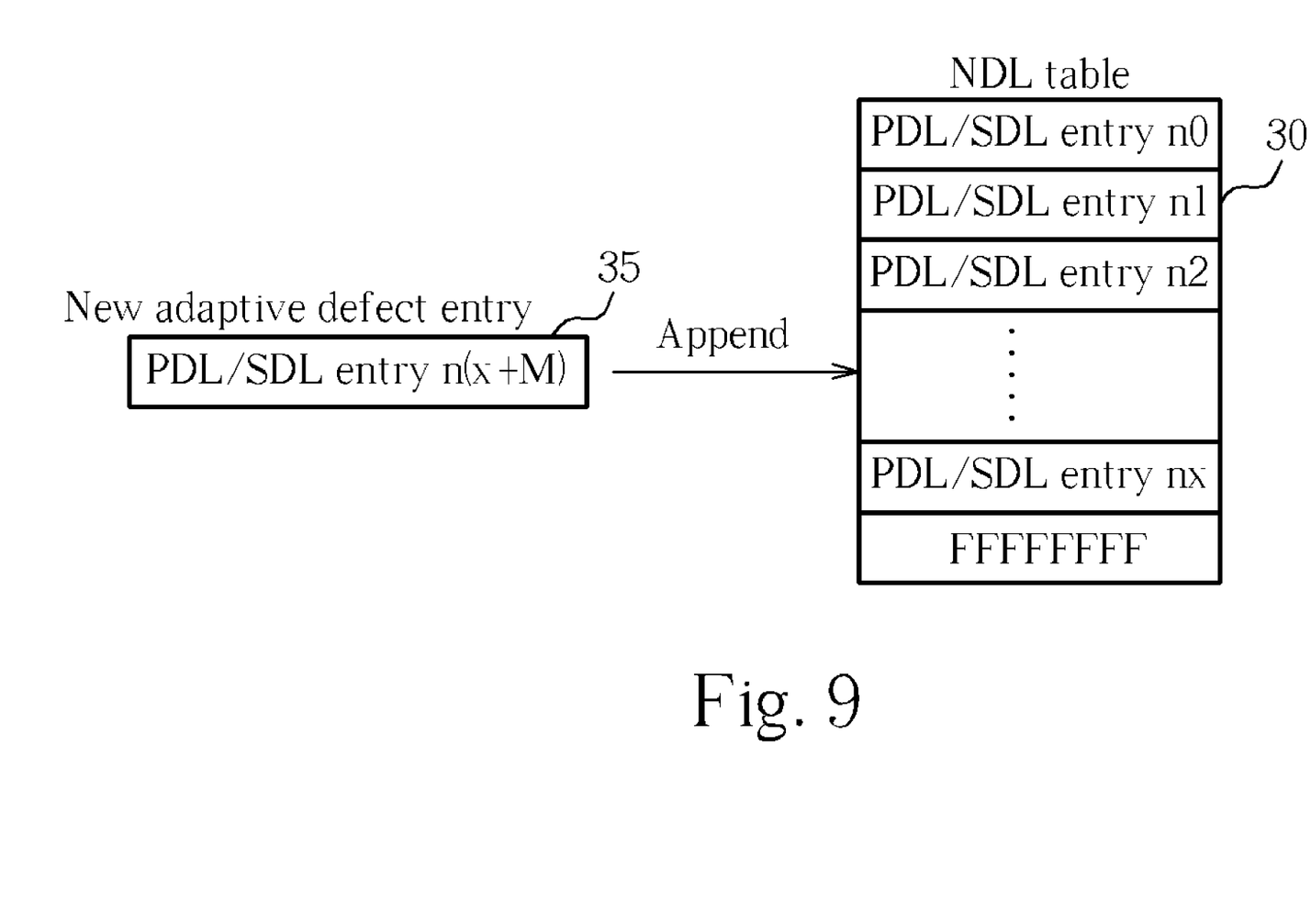
FIG. 9 is a diagram showing a new adaptive defect entry being directly appended to the NDL table according to an embodiment of the present invention.

Please refer again to FIG. 6. Rather than the scenario just described, if in step 435 it is determined that the address of the most recent adaptive defect entry recorded in the NDL table 30 contains an address of a defective data block smaller than the address of the newly detected defective data block then the new adaptive defect entry is directly appended to the NDL table 30 in step 445. Please refer to FIG. 9. FIG. 9 is a diagram showing the new adaptive defect entry being directly appended to the NDL table 30. As shown in FIG. 9, the new adaptive defect entry n (x+M) records an address for the newly detected defective data block greater than the address contained in the last adaptive defect entry n x stored in the NDL table 30. Therefore, the new adaptive defect entry n (x+M) is directly appended to the NDL table 30 and no merging operation is needed. Please note that the NDL table 30 in FIG. 9 is shown being possible either PDL or SDL compatible and this is indicated by the "PDL/SDL" notation in the adaptive defect entries of the NDL table 30.

Finally, in step 450, all adaptive defect entries existing in the NDL table 30 are merged with either the PDL table 26 or the SDL table 28 in the memory 108 before exiting the disc operation mode, either disc formatting stage or data writing stage. As mentioned above, before the optical disc 102 is ejected, the PDL table 26 and the SDL table 28 in the memory 108 are written back to the optical disc 102.

Please note, that in the above embodiment, the NDL table 30 can be merged with either the PDL table 26 or the SDL table 28 in the memory 108 based on a number of conditions. For example, one such condition can be after a predetermined time period. For example, for reliability, the present invention can perform the merging operation from time to time. Additionally, the condition for merging can be when any operation of the optical disc drive has been performed. These conditions are by way of example and not a limitation of the present invention. Additional conditions can be utilized and are well-known to those of average skill in this art and are therefore omitted here.

Please note, that in the above embodiment, the detailed defect table management scheme is applied to a DVD-RAM disc. However, this is only meant to be an example, and is not meant to be taken as a limitation of the present invention.

In contrast to the related art, the number of times of sorting the entries in the PDL table or the SDL table is reduced by using the NDL table to buffer the adaptive defect entries of the new defective data blocks on the optical disc. In addition, when a merging operation is actuated, the NDL table to be merged with the PDL table or the SDL table have adaptive defect entries stored in adaptive defect entry address order already, which simplifies the merging operation.

Those skilled in the art will readily observe that numerous modifications and alterations of the device and method may be made while retaining the teachings of the invention. Accordingly, the above invention should be construed as limited only by the metes and bounds of the appended claims.

What is claimed is:

1. A defect management method applied in an optical disc drive for managing defect information of an optical disc, the optical disc drive saving a plurality of defect tables comprising at least a first defect table and a second defect table, the first defect table recording a plurality of first defect entries and the second defect table recording a plurality of second defect entries, the method comprising:

appending an adaptive defect entry comprising a new defect information corresponding to a new defect into a new defect table, a data structure of the adaptive defect entry being compatible with data structures of the defect entries recorded in the first defect table and the second defect table; and merging the adaptive defect entries into one of the defect tables saved in the optical disc drive when a condition is met.

2. The method of claim 1, wherein the first defect table is a primary defect list defect table (PDL defect table) and the first defect entry is a PDL defect entry, the PDL defect entry each being used to record an address of a defect on the optical disc.

3. The method of claim 1, wherein the second defect table is a secondary defect list defect table (SDL defect table) and the second defect entry is a SDL defect entry, the SDL defect entry each being used to record an address of a defect and a corresponding replacement information of the defect.

4. The method of claim 1, wherein when the optical disc drive performing a disc formatting operation and the first defect table is not full, the data structure of the adaptive defect entry is compatible with the data structure of first defect entry.

5. The method of claim 1, wherein when the optical disc drive performing a disc formatting operation and the first defect table is full, the data structure of the adaptive defect entry is compatible with the data structure of second defect entry.

6. The method of claim 1, wherein when the optical disc drive performing a disc writing operation, the data structure of the adaptive defect entry is compatible with the data structure of second defect entry.

7. The method of claim 1, wherein the data structure of the adaptive defect entry comprises an address of the defect, and the method further comprises:
   when the optical disc drive encountering a new defect, and an address of the new defect is larger than the address of the last defect entry, appending the defect information corresponding to the new defect into the new defect table.

8. The method of claim 1, wherein the data structure of the adaptive defect entry comprises an address of the defect, and the condition is when the optical disc drive encounters a new defect, and an address of the new defect is smaller than the address of the last defect entry.

9. The method of claim 1, wherein the condition is a predetermined time period for the optical disc drive performing a predetermined operation.

10. The method of claim 1, wherein the condition is the new defect table is full.

11. The method of claim 1, wherein the condition is that when an operation of the optical disc drive has been performed.

12. A defect management system applied in an optical disc drive for managing defect information of an optical disc, said optical disc drive including a pick up head, the system comprising:
    a memory for
      saving a plurality of defect tables comprising at least a first defect table and a second defect table, the first defect table recording a plurality of first defect entries, the second defect table recording a plurality of second defect entries, and
      saving a new defect table for recording a plurality of adaptive defect entries corresponding to a plurality of new defect information, a data structure of the adaptive defect entries being compatible with data structures of the defect entries recorded in the first defect table and the second defect table; and
    a controller, coupled to the pick-up head and the memory, for
      controlling the pick-up head to access the first and second defect tables from the optical disc and store the defect tables into the memory,
      appending a new defect entry into the new defect table until meeting a condition, and
      merging the adaptive defect entries into one of the defect tables saved in the optical disc drive when a condition is met.

13. The system of claim 12, wherein the first defect table is a primary defect list defect table (PDL defect table) and the first defect entry is a PDL defect entry, the PDL defect entry each being used to record an address of a defect on the optical disc.

14. The system of claim 12, wherein the second defect table is a secondary defect list defect table (SDL defect table) and the second defect entry is a SDL defect entry, the SDL defect entry each being used to record an address of a defect and a corresponding replacement information of the defect.

15. The system of claim 12, wherein when the optical disc drive performing a disc formatting operation and the first defect table is not full, the data structure of the adaptive defect entry is compatible with the data structure of first defect entry.

16. The system of claim 12, wherein when the optical disc drive performing a disc formatting operation and the first defect table is full, the data structure of the adaptive defect entry is compatible with the data structure of second defect entry.

17. The system of claim 12, wherein when the optical disc drive performing a disc writing operation, the data structure of the adaptive defect entry is compatible with the data structure of second defect entry.

18. The system of claim 12, wherein the data structure of the adaptive defect entry comprises an address of the defect, and when the optical disc drive encountering a new defect and an address of the new defect is larger than the address of the last defect entry, the controller appends the new defect information corresponding to the new defect into the new defect table.

19. The system of claim 12, wherein the data structure of the adaptive defect entry comprises an address of the defect, and the condition is when the optical disc drive encounters a new defect, and an address of the new defect is smaller than the address of the last defect entry.

20. The system of claim 12, wherein the condition is a predetermined time period for the optical disc drive performing a predetermined operation.

21. The system of claim 12, wherein the condition is the new defect table is full.

22. The system of claim 12, wherein the condition is that when an operation of the optical disc drive has been performed.

* * * * *